(12) United States Patent
Kim

(10) Patent No.: US 9,963,180 B2
(45) Date of Patent: May 8, 2018

(54) TWO-WHEELED VEHICLE WITH IMPROVED TURNING STABILITY

(71) Applicant: Yong Wook Kim, Seoul (KR)

(72) Inventor: Yong Wook Kim, Seoul (KR)

(*) Notice: Subject to any disclaimer, the term of this patent is extended or adjusted under 35 U.S.C. 154(b) by 0 days. days.

(21) Appl. No.: 15/325,835

(22) PCT Filed: Jul. 14, 2015

(86) PCT No.: PCT/KR2015/007281
§ 371 (c)(1),
(2) Date: Jan. 12, 2017

(87) PCT Pub. No.: WO2016/010331
PCT Pub. Date: Jan. 21, 2016

(65) Prior Publication Data
US 2017/0158271 A1     Jun. 8, 2017

(30) Foreign Application Priority Data

Jul. 15, 2014  (KR) .................. 10-2014-0089206

(51) Int. Cl.
*B62H 1/12*     (2006.01)
*B62H 7/00*     (2006.01)
*B62K 5/08*     (2006.01)
*B62K 17/00*    (2006.01)

(52) U.S. Cl.
CPC .............. *B62H 1/12* (2013.01); *B62H 7/00* (2013.01); *B62K 5/08* (2013.01); *B62K 17/00* (2013.01)

(58) Field of Classification Search
CPC ........................................... B62H 1/12
See application file for complete search history.

(56) References Cited

FOREIGN PATENT DOCUMENTS

| JP | 2005-82144 | 3/2005 |
|---|---|---|
| KR | 1991-0007850 | 10/1991 |
| KR | 1999-0017351 U | 5/1999 |
| KR | 10-2012-0027625 A | 3/2012 |
| KR | 10-2014-0030005 A | 3/2014 |
| KR | 10-2014-0075535 A | 6/2014 |
| KR | 10-2014-0083381 A | 7/2014 |

OTHER PUBLICATIONS

International Search Report dated Mar. 31, 2016 in counterpart International Application No. PCT/KR2015/007281 (2 pages in English).

*Primary Examiner* — Kevin Hurley
(74) *Attorney, Agent, or Firm* — NSIP Law

(57) ABSTRACT

A two-wheeled vehicle which includes a two-wheeled vehicle body, a front wheel and a rear wheel respectively rotatably installed at a front and a rear of the two-wheeled vehicle body, and a steering system steering the front wheel is disclosed. The two-wheeled vehicle includes auxiliary wheels connected to the front wheel on both sides of the two-wheeled vehicle body and steered together with the front wheel by the steering system, lifting devices configured to adjust distances of the auxiliary wheels from the ground, and gap adjusting devices configured to adjust lateral gaps of the auxiliary wheels from the two-wheeled vehicle body. The auxiliary wheels are spaced apart from the ground while traveling straight. And an inclination of the two-wheeled vehicle body while turning is limited as one of the auxiliary wheels comes into contact with the ground.

6 Claims, 8 Drawing Sheets

TWO-WHEELED VEHICLE WITH IMPROVED TURNING STABILITY

CROSS-REFERENCE TO RELATED APPLICATIONS

This application claims the benefit under 35 USC 119(a) of PCT Application No. PCT/KR2015/007281, filed on Jul. 14, 2015, which claims the benefit of Korean Patent Application No. 10-2014-0089206 filed Jul. 15, 2014, in the Korean Intellectual Property Office, the entire disclosure of which is incorporated herein by reference for all purposes.

TECHNICAL FIELD

The present invention relates to a two-wheeled vehicle in which a front wheel is steered, and more particularly, to a two-wheeled vehicle for improving turning stability.

BACKGROUND ART

A two-wheeled vehicle denotes a vehicle that has two wheels such as a bicycle or a motorcycle and includes a vehicle body frame, a front wheel, a rear wheel, a suspension system, a steering system, and the like.

Since the balance of the two-wheeled vehicle is not maintained by only the front and rear wheels while parking, a driver stands the two-wheeled vehicle by standing a stand installed at a side of the vehicle body frame on the ground, and when traveling at a low speed and changing a traveling direction, the driver has to maintain the balance of the two-wheeled vehicle by a sole of driver's foot coming into contact with the ground.

Particularly, when the two-wheeled vehicle is turning, even though the vehicle body frame and the driver may turn while aligned, the driver generally has to tilt driver's body further inward or outward than the vehicle body frame is tilted to turn in order to maintain balance using centrifugal force and gravity while turning.

That is, when driving skill of the driver is immature in cornering the two-wheeled vehicle, the balance of the two-wheeled vehicle is not maintained and the two-wheeled vehicle thus falls down, and when a road is irregular or slippery due to rain, snow, or the like as well as when cornering, there is a problem in that the immature driver has a difficulty in maintaining the balance.

A stabilization device of a two-wheeled vehicle disclosed in Korean Laid-Open Patent Publication No. 10-2012-0027625 includes auxiliary wheels 25 and 35 in the middle of a frame for stabilizing the two-wheeled vehicle while traveling. Here, although levels of the auxiliary wheels, which are always in contact with the ground, are changed by shock absorbers 40 and 50, the auxiliary wheels may actually hinder turning due to continuous friction with the ground or different turning radiuses of the auxiliary wheels from that of a front wheel during turning.

Furthermore, Korean Laid-Open Utility Model Registration Application Publication No. 1999-0017351 discloses a motorcycle in which auxiliary wheel devices configured to maintain vertical balance of a vehicle body are installed. Although auxiliary wheels of the auxiliary wheel devices are lifted not to come into contact with the ground while traveling, the auxiliary wheels may not provide a function for improving turning stability during travel, and their use is limited to only a state in which the motor cycle is not traveling.

DISCLOSURE

Technical Problem

The present invention is directed to providing a two-wheeled vehicle in which turning stability is improved.

Technical Solution

One aspect of the present invention provides a two-wheeled vehicle, which includes a two-wheeled vehicle body, and a front wheel and a rear wheel respectively rotatably installed at a front and a rear of the two-wheeled vehicle body, and a steering system in which steering the front wheel is steered by a steering system. The two-wheeled vehicle comprising auxiliary wheels connected to the front wheel on both sides of the two-wheeled vehicle body and steered together with the front wheel with the same rotational center by the steering system configured to steer the front wheel; lifting devices configured to adjust vertical gaps of the auxiliary wheels from the ground; and gap adjusting devices configured to laterally move the auxiliary wheels to adjust lateral gaps of the auxiliary wheels from the two-wheeled vehicle body, wherein the auxiliary wheels are spaced apart from the ground while traveling straight, wherein an inclination of the two-wheeled vehicle body generated while turning is limited as when one of the auxiliary wheels comes into contact with the ground, wherein the limitation of the inclination of the two-wheeled vehicle is due to the adjustment of one of the vertical and lateral gaps of the auxiliary wheels is adjusted while stopping or turning or not traveling, the inclination of the two-wheeled vehicle is limited by the auxiliary wheels coming into contact with the ground, and wherein the one of the auxiliary wheels areis brought closer to the ground or into contact with the ground by the lifting devices and the auxiliary wheels are spaced farther from the two-wheeled vehicle body by the gap adjusting devices when turning than when traveling straight.

Levels of the auxiliary wheels may be changed according to a state of a road so as not to hinder traveling, and furthermore, an inclination limitation of the two-wheeled vehicle body may also be adjusted by the levels of the auxiliary wheels or lateral gaps from the two-wheeled vehicle body being adjusted considering a driving skill of a driver.

Especially, a steering angle of the auxiliary wheels may always be the same as that of the front wheel so that rotating shafts of the auxiliary wheels and the front wheel are always parallel to each other, the front wheel and the auxiliary wheel steered by the same steering system have the same rotational center and are easy to rotate because they are positioned on different concentric circles, and stability is improved while traveling.

In addition, the auxiliary wheels steered together with the front wheel are preferably disposed closer to the front wheel than the rear wheel, and specifically, distances from the auxiliary wheels to the front wheel may be shorter than distances from the auxiliary wheels to the rear wheel in a longitudinal direction of the two-wheeled vehicle body.

In addition, at least one gap among the vertical and lateral gaps of the auxiliary wheels may be adjusted and an inclination of the two-wheeled vehicle body may be limited by one of the auxiliary wheels coming into contact with the ground surface when the two-wheeled vehicle is not traveling.

Specifically, the auxiliary wheels may be brought closer to or into contact with the ground by the lifting devices and may be spaced farther apart from the two-wheeled vehicle body by the gap adjusting devices when the two-wheeled vehicle is not traveling in comparison to a traveling state thereof.

Advantageous Effects

A two-wheeled vehicle according to the present invention includes auxiliary wheels that are spaced apart from the ground while traveling so that the auxiliary wheels do not hinder travel. And the auxiliary wheels limit an inclination of the two-wheeled vehicle body while turning, thus the two-wheeled vehicle body can be prevented from being tilted beyond a predetermined angle. And particularly, the two-wheeled vehicle body is prevented from being tilted beyond the predetermined angle by adjusting levels or lateral gaps of the auxiliary wheels considering driving skill of a driver so that traveling stability can be significantly improved regardless of the driving skill of a driver.

In addition, a front wheel and the auxiliary wheels steered by the same steering system have the same rotational center in the two-wheeled vehicle according to the present invention so that steering is easy, and the front wheel and the auxiliary wheels are positioned on concentric circles having different sizes so that stability is improved while turning.

In addition, the two-wheeled vehicle according to the present invention can be simply stood by adjusting vertical or lateral gaps of the auxiliary wheels when stopped.

MODES OF THE INVENTION

Figure 1:
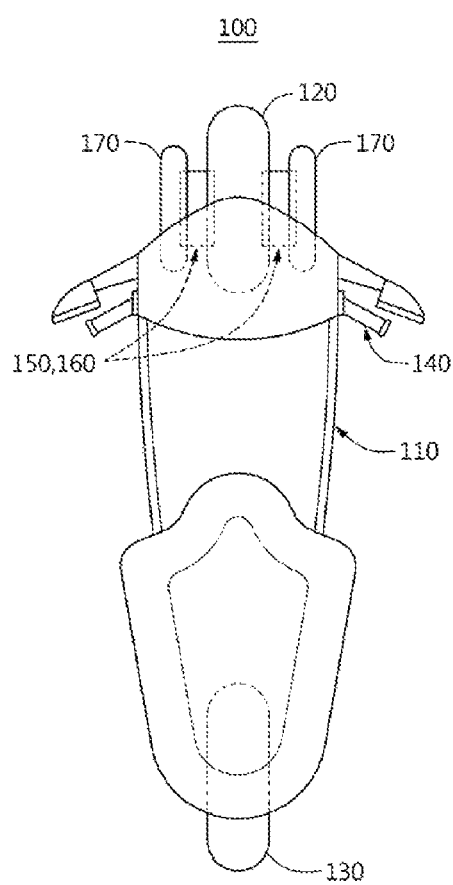
FIG. 1 is a configuration diagram illustrating a two-wheeled vehicle according to one embodiment of the present invention.

Hereinafter, an exemplary embodiment of the present invention will be described in detail with reference to the accompanying drawings, but is not limited or restricted thereto. For reference, the same reference numerals actually denote the same components in this specification, components illustrated in different drawings may be described under the above rule, and descriptions which are well known to those skilled in the art or redundant will be omitted.

Figure 2:
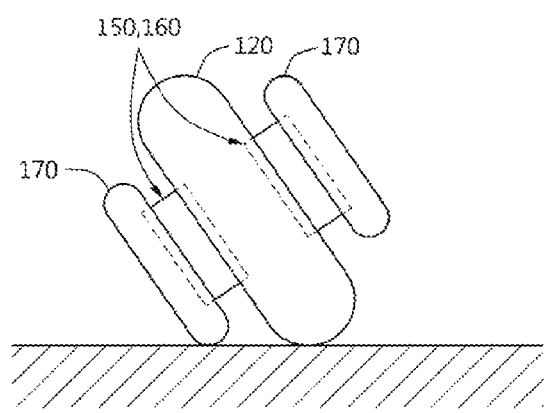
FIG. 2 is a view for describing a state in which vertical and lateral gaps of auxiliary wheels are adjusted while the two-wheeled vehicle according to one embodiment of the present invention is turning.
Figure 3:
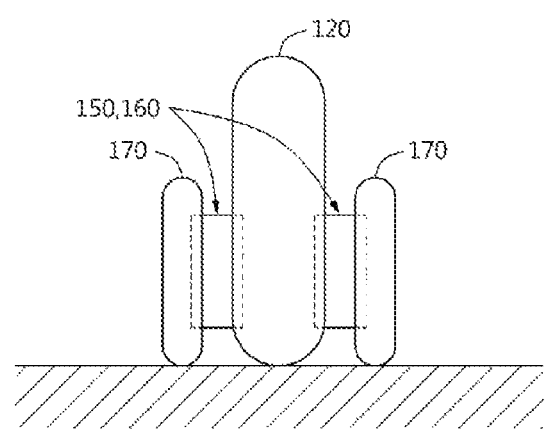
FIG. 3 is a view for describing a state in which vertical and lateral gaps of the auxiliary wheels are adjusted while the two-wheeled vehicle according to one embodiment of the present invention is stopped.

FIG. 1 is a configuration diagram illustrating a two-wheeled vehicle according to one embodiment of the present invention, FIG. 2 is a view for describing a state in which vertical and lateral gaps of auxiliary wheels are adjusted while the two-wheeled vehicle according to one embodiment of the present invention is turning, and FIG. 3 is a view for describing a state in which vertical and lateral gaps of the auxiliary wheels are adjusted while the two-wheeled vehicle according to one embodiment of the present invention is stopped.

Referring to FIGS. 1 to 3, a two-wheeled vehicle 100 includes a two-wheeled vehicle body 110, a front wheel 120, a rear wheel 130, a steering system 140, lifting devices 150, gap adjusting devices 160, and auxiliary wheels 170.

The components such as the two-wheeled vehicle body 110, the front wheel 120, the steering system 140, and the rear wheel 130 of the two-wheeled vehicle 100 may be known with reference to technology regarding the two-wheeled vehicle disclosed in the above-described Korean Laid-Open Utility Model Registration Application Publication or technology regarding a two-wheeled vehicle that is already widely disclosed.

First, as illustrated in FIG. 1, each of the auxiliary wheels 170 of the two-wheeled vehicle 100 according to the present invention is provided to be rotated with the front wheel 120 by the steering system 140.

The steering system is a device in which a handle or a handle bar is turned to change an angle of the front wheel, when a handle is operated, a rotating force is transmitted to a steering gear, the two-wheeled vehicle may be decelerated by the steering gear to change a direction of the front wheel, and the steering system typically includes a rack-pinion steering system.

In the present invention, a pivot of the handle is transmitted to the front wheel using the steering system, and the auxiliary wheels pivot with the front wheel. Accordingly, the auxiliary wheels being steered by the steering system of the front wheel in the present specification denotes that the auxiliary wheels pivot with pivoting of the front wheel. For example, although the auxiliary wheels and the front wheel may be pivoted by one steering handle, the auxiliary wheels and the front wheel do not need to use the same steering gear, and the auxiliary wheels may also be pivoted by separate steering gears. Power, which transmits rotating forces to the front wheel and the auxiliary wheels, may be individually provided.

In any case, rotational centers of the auxiliary wheels 170, which always have a steering angle that is the same as that of the front wheel 120, are the same as that of the front wheel 120 to ease turning while traveling, and the auxiliary wheels 170 are positioned on concentric circles having different sizes so that traveling stability of the two-wheeled vehicle 100 can be significantly improved while turning.

When rotational centers of the auxiliary wheels and the front wheel are different from each other, sliding momentum occurs between a geometric trajectory and an ideal trajectory, which is a major factor that hinders turning. Turning being hindered due to sliding momentum may be known with reference to descriptions regarding a widely known parallelogram steering device.

Meanwhile, in the present embodiment, vertical gaps of the auxiliary wheels 170 from the ground and lateral gaps thereof from the two-wheeled vehicle body 110 are adjusted.

Specifically, the lifting devices 150 may move the auxiliary wheels 170 to adjust the vertical gaps of the auxiliary wheels 170 from the ground, and the gap adjusting devices 160 laterally move the auxiliary wheels 170 to adjust the lateral gaps of the auxiliary wheels 170 from the two-wheeled vehicle body 110.

In addition, in the case of the lifting devices 150, the auxiliary wheels 170 may be directly adjusted according to the present embodiment, but in some cases, levels of the auxiliary wheels may also be relatively adjusted by adjusting a level of the front wheel.

Each of the components of the two-wheeled vehicle according to the present embodiment were described above, and hereinafter, movement of the auxiliary wheels while turning and movement of the auxiliary wheels while not traveling will be described in detail with reference to examples.

FIG. 2 is a view for describing a state in which vertical and lateral gaps of auxiliary wheels are adjusted while a two-wheeled vehicle according to one embodiment of the present invention is turning. Referring to FIG. 2, the auxiliary wheels 170 are spaced apart from the ground to prevent the auxiliary wheels 170 from hindering traveling during general straight travel.

However, as illustrated in FIG. 2, an inclination of the two-wheeled vehicle body generated while turning is limited because one of the auxiliary wheels 170 comes into contact with the ground, and thus the two-wheeled vehicle body is prevented from being tilted beyond a predetermined angle.

In addition, the limitation of the inclination of the two-wheeled vehicle body may also be adjusted by adjusting levels of the auxiliary wheels or gaps thereof from the two-wheeled vehicle body considering a driving skill of a driver.

For example, in case that there is no change of the distances of the auxiliary wheels 170 from the ground, the farther the distances from the auxiliary wheels 170 to the two-wheeled vehicle body become using the gap adjusting devices 160, the less the maximum angle of inclination of the two-wheeled vehicle body becomes.

In another example, in case that the auxiliary wheels 170 are spaced the same distance from the two-wheeled vehicle body, the closer the auxiliary wheels 170 become from the ground using the lifting devices 150, the less the maximum angle of inclination of the two-wheeled vehicle body becomes.

FIG. 3 is a view for describing a state in which vertical and lateral gaps of the auxiliary wheels are adjusted when the two-wheeled vehicle according to one embodiment of the present invention is not traveling. Referring to FIG. 3, when the two-wheeled vehicle is in a standstill state, since at least one of the vertical and lateral gaps of the auxiliary wheels 170 is adjusted, an inclination of the two-wheeled vehicle body may be limited by one of the auxiliary wheels 170 being in contact with the ground. Specifically, one of the auxiliary wheels 170 may be brought closer to or into contact with the ground by the lifting devices 150, and the auxiliary wheels 170 may be spaced farther apart from the two-wheeled vehicle body by the gap adjusting devices 160 when the two-wheeled vehicle is in a standstill state compared to a traveling state thereof.

Figure 4:
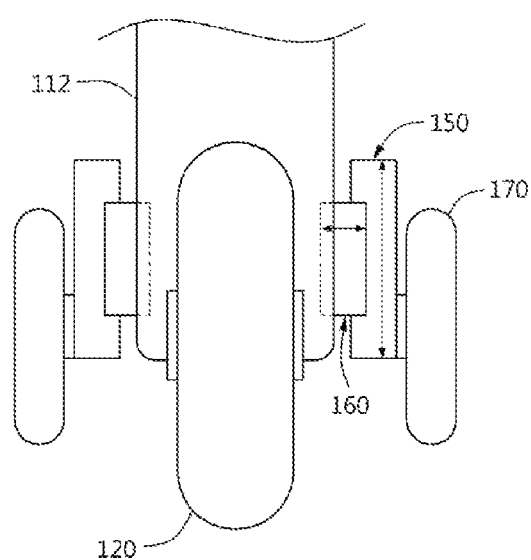
FIGS. 4 and 5 are views illustrating one example of a lifting device and a gap adjusting device.
Figure 5:
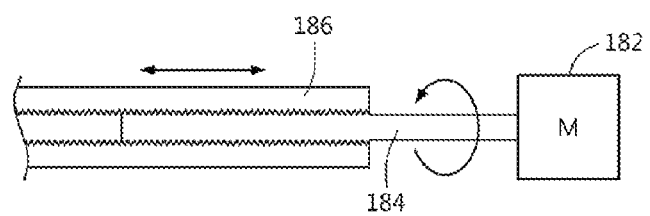

An internal cylinder 184 and an external cylinder 186 are illustrated in FIG. 5. The internal cylinder 184 is connected to a rotating shaft of a motor 182. And the external cylinder 186 is disposed outside the internal cylinder 184 and screw threads of the external cylinder 186 formed on an inner surface thereof are engaged with screw threads of the internal cylinder 184 formed on an outer surface thereof. The external cylinder 186 may move in a lateral direction in FIG. 5 according to a rotating direction of the motor 182. And the gap adjusting device 160 which are configured to laterally move the auxiliary wheels 170 and the lifting devices 150 which are configured to vertically move the auxiliary wheels 170 illustrated in FIG. 4 may be implemented using the internal and external cylinders 184 and 186 illustrated in FIG. 5.

However, a power supply (the motor) and the components (the internal and external cylinders) configured to transmit the power described with reference to FIG. 5 are one example for actually implementing the lifting devices or the gap adjusting devices. And the lifting devices configured to vertically move the auxiliary wheels or the gap adjusting devices configured to laterally move the auxiliary wheels may be easily provided by changing a design of a pneumatic or hydraulic cylinder, a solenoid, a rack-pinion, or the like in a range which allows the auxiliary wheels to vertically or laterally move. The present invention is not limited to the specific components for the power supply or power transmission.

Meanwhile, referring again to FIG. 4, a rotating shaft of the front wheel 120 and rotating shafts of the auxiliary wheels 170 are physically separated from each other. Specifically, although the front wheel 120 and the auxiliary wheels 170 are designed to be pivoted by the same steering system, the rotating shaft of the front wheel 120 is disposed inside a front frame 112 and is steered by separate steering gears connected to a handle, and the rotating shafts of the auxiliary wheels 170 may have rotating shafts connected to the lifting devices 150 and physically separated from each other. Here, the front frame 112 on which the lifting devices 150 are disposed is connected to the steering system to pivot.

Accordingly, as illustrated in FIG. 5 when a driver pivots the front wheel 120 by using the steering system to pivot the front wheel 120, the front wheel 120 and the auxiliary wheels 170 may be steered to have the same angle even though the front wheel 120 and the auxiliary wheels 170 have the different rotating shafts.

Meanwhile, although the gap adjusting devices 160, the lifting devices 150, and the auxiliary wheels 170 are sequentially connected to the front frame 112 which is a front portion of the two-wheeled vehicle body 110, a connection order thereof may be the front frame, the lifting devices, the gap adjusting devices, and the auxiliary wheels in some cases, and in such cases, the rotating shafts of the auxiliary wheels may also be connected to the gap adjusting devices.

Figure 6:
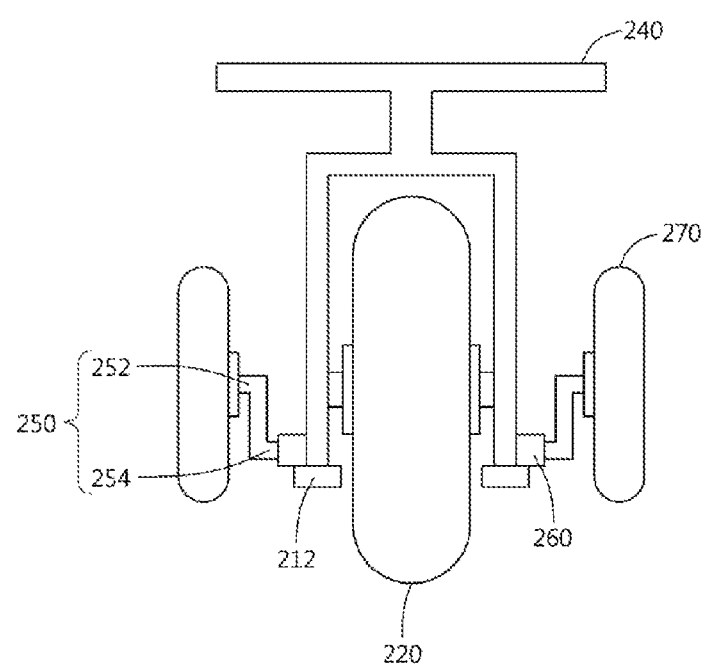
FIG. 6 is a configuration diagram illustrating a two-wheeled vehicle according to another embodiment of the present invention.

FIG. 6 is a configuration diagram illustrating a two-wheeled vehicle according to another embodiment of the present invention. A two-wheeled vehicle according to the present embodiment may include a two-wheeled vehicle body, a front wheel 220, a rear wheel, a steering system 240, lifting devices 250, gap adjusting devices 260, and auxiliary wheels 270 like the previous embodiment.

The descriptions of the components according to the present embodiment may be known with reference to the descriptions of the components according to the previous embodiment, and in the present embodiment, components which are different from that of the previous embodiment, particularly the lifting devices 250, will be mainly described in detail.

First, the steering system 240 including a handle may be designed to pivot a rotating shaft thereof to steer the front wheel 220. In addition, the gap adjusting devices 260 are disposed on a portion of the front frame 212, which is included in the two-wheeled vehicle body but is separated from a portion on which a driver sits or a portion connected to the rear wheel, to be pivoted by the steering system. In the present embodiment, for the sake of convenience in the description, although the front frame is described to be included in the two-wheeled vehicle body, the front frame 212 may be actually a part of the steering system pivoted by the handle at a lowest end of the steering system as illustrated in FIG. 6, and may actually correspond to a component on which the gap adjusting devices or the lifting devices are seated.

In any case, the gap adjusting devices 260 according to present embodiment are disposed on the front frame 212 pivoted by the steering system, and the lifting devices 250 are connected to the gap adjusting devices 260.

Although the gap adjusting devices 260 are provided with a structure of a cylinder, a solenoid, or a rack-pinion and may adjust gaps between the auxiliary wheels 270 and the two-wheeled vehicle body similarly to the previous embodiment, the lifting devices 250 according to the present embodiment may be a very simple-structured component rather than in a cylinder structure previously illustrated in FIG. 5, a pneumatic or hydraulic cylinder, a solenoid, a rack-pinion, or the like.

Specifically, each of the lifting devices 250 includes first and second shafts 252 and 254 integrally manufactured in parallel to have a step, the second shaft 254 is rotatably connected to the gap adjusting device 260, and the first shaft 252 is connected to an auxiliary wheel 270 and substantially serves a role of a rotating shaft of the auxiliary wheel 270.

When the above-described lifting device 250 is used, a level of the auxiliary wheel 270 may be adjusted by rotating the second shaft 252.

Although the second shaft according to the present embodiment is described as be directly connected to the gap adjusting device, a motor configured to rotate the second shaft may be additionally provided therebetween, the motor configured to rotate the second shaft may be directly disposed at the front frame, and the gap adjusting device configured to adjust a lateral gap between the auxiliary wheel and the two-wheeled vehicle body may also be disposed between the auxiliary wheel and the first shaft.

In addition, the auxiliary wheel according to the present embodiment may also include a separate power device or a braking device such as a brake, and suspension systems configured to absorb shock may be provided at the front and rear wheels and the auxiliary wheels to prevent shock of a road from being transmitted to a vehicle body or passengers.

Figure 7A:
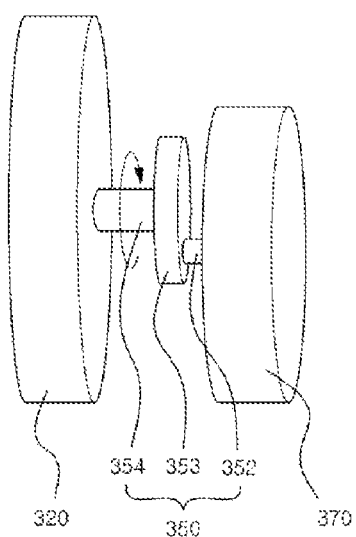
FIGS. 7A and 7B are examples of a view illustrating a connecting structure of an auxiliary wheel and a front wheel that is applied to still another embodiment of the present invention.
Figure 7B:
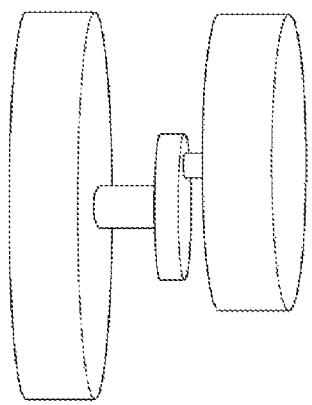

Referring to FIGS. 7A and 7B, a connecting structure of an auxiliary wheel and a front wheel which may be applied to still another embodiment of the present invention is illustrated. Specifically, a state view in which the auxiliary wheel comes into contact with the ground is illustrated in FIG. 7A and a state view in which a level of the auxiliary wheel is changed while being moved forward or backward by a lifting device is illustrated in FIG. 7B. For reference, even though only a right auxiliary wheel is illustrated in FIGS. 7A and 7B, a left auxiliary wheel is connected to the front wheel through the lifting device and a gap adjusting device. Even though a second shaft is illustrated as being directly connected to the front wheel in the drawing, the drawings are a schematic view, and the auxiliary wheel may be connected to a vehicle body like in the previous embodiment rather than being directly connected to the front wheel.

First, a front wheel 320 and an auxiliary wheel 370 may be connected to each other through a lifting device 350 and the gap adjusting device. The lifting device 350 according to the present embodiment includes a rotating circular plate 353, and a first shaft 352 and a second shaft 354 between which the rotating circular plate 353 is interposed and which connect the front wheel 320 and the auxiliary wheel 370. The first shaft 352 and the second shaft 354 are parallel to each other and are disposed in a state of having a step such that distances thereof from the center of the rotating circular plate 353 are different. Accordingly, a level of the auxiliary wheel 370 is adjusted and the auxiliary wheel may also be moved forward or backward by rotation of the rotating circular plate 353.

For reference, the gap adjusting device may be interposed between the lifting device and a two-wheeled vehicle body like in the previous embodiment, and the first shaft or the second shaft may also be provided to allow lengths to be adjustable.

In addition, a spring capable of absorbing shock may also be disposed between a circular plate and a shaft in the first shaft or the second shaft.

A frame-shaped frame or capsule-shaped frame configured to protect a driver may be manufactured and installed on a body of the two-wheeled vehicle according to the present invention.

In addition, the auxiliary wheel may move vertically or laterally in conjunction with a speed and a rotational inclination thereof, and the auxiliary wheel may move forward or backward when the lifting device according to the present invention is used. For example, the auxiliary wheel may move from the rear to the front of the two-wheeled vehicle so that the two-wheeled vehicle reacts to a speed increase and stably travels. The auxiliary wheel may be moved farther away from the vehicle body in an oblique direction. In addition, only one of the auxiliary wheels between which the front wheel is interposed and which are disposed at both sides of the front wheel may be moved vertically or laterally and forward or backward according to a rotation direction thereof.

Although the auxiliary wheels may also be automatically controlled, a driver may manually directly adjust an inclination between the ground and the auxiliary wheels in specific cases such as when it rains or snows, and may fix the auxiliary wheels to the ground while traveling at low speed.

Such position control of the auxiliary wheels may be automatically implemented using a sensor, such as a gyro sensor, an acceleration sensor, or an attitude sensor, and a control system in conjunction therewith.

While the present invention has been described above with reference to the embodiments, those skilled in the art should understand that various modifications and alterations may be made without departing from the spirit and scope of the present invention described in the appended claims.

INDUSTRIAL APPLICABILITY

A two-wheeled vehicle according to the present invention can improve stability of turning and thus can be widely used for traveling.

The invention claimed is:
1. A two-wheeled vehicle which includes a two-wheeled vehicle body, a front wheel and a rear wheel respectively rotatably installed at a front and a rear of the two-wheeled vehicle body, and a steering system steering the front wheel, the two-wheeled vehicle comprising:
auxiliary wheels connected to the front wheel on both sides of the two-wheeled vehicle body and steered together with the front wheel with the same rotational center by the steering system configured to steer the front wheel;
lifting devices configured to adjust vertical gaps of the auxiliary wheels from the ground; and
gap adjusting devices configured to laterally move the auxiliary wheels to adjust lateral gaps of the auxiliary wheels from the two-wheeled vehicle body, wherein the auxiliary wheels are spaced apart from the ground while traveling straight, wherein an inclination of the two-wheeled vehicle body generated while turning is limited as one of the auxiliary wheels comes into contact with the ground, wherein the limitation of the inclination of the two-wheeled vehicle is due to the adjustment of one of the vertical and lateral gaps of the auxiliary wheels while turning or not traveling, and wherein the one of the auxiliary wheels is brought closer to the ground or into contact with the ground by the lifting devices and the auxiliary wheels are spaced farther from the two-wheeled vehicle body by the gap adjusting devices when turning than when traveling straight.

2. A two-wheeled vehicle which includes a two-wheeled vehicle body, a front wheel and a rear wheel respectively rotatably installed at a front and a rear of the two-wheeled vehicle body, and a steering system steering the front wheel, the two-wheeled vehicle comprising:

auxiliary wheels connected to the front wheel on both sides of the two-wheeled vehicle body and steered together with the front wheel with the same rotational center by the steering system configured to steer the front wheel;

lifting devices configured to adjust vertical gaps of the auxiliary wheels from the ground; and gap adjusting devices configured to laterally move the auxiliary wheels to adjust lateral gaps of the auxiliary wheels from the two-wheeled vehicle body, wherein the auxiliary wheels are spaced apart from the ground while traveling straight, wherein an inclination of the two-wheeled vehicle body generated while turning is limited as one of the auxiliary wheels comes into contact with the ground, and wherein the lifting devices include first and second shafts connected in parallel with a step, the first shafts are connected to the auxiliary wheels, and the vertical gaps are adjusted by rotation of the second shafts.

3. The two-wheeled vehicle of claim 1, wherein distances from the auxiliary wheels to the front wheel are shorter than distances from the auxiliary wheels to the rear wheel in a longitudinal direction of the two-wheeled vehicle body.

4. The two-wheeled vehicle of claim 1, wherein a steering angle of the auxiliary wheels is always the same as that of the front wheel so that rotating shafts of the auxiliary wheels and the front wheel are always parallel to each other.

5. The two-wheeled vehicle of claim 2, wherein distances from the auxiliary wheels to the front wheel are shorter than distances from the auxiliary wheels to the rear wheel in a longitudinal direction of the two-wheeled vehicle body.

6. The two-wheeled vehicle of claim 2, wherein a steering angle of the auxiliary wheels is always the same as that of the front wheel so that rotating shafts of the auxiliary wheels and the front wheel are always parallel to each other.

\* \* \* \* \*